United States Patent
Caswell et al.

(10) Patent No.: US 6,829,703 B1
(45) Date of Patent: Dec. 7, 2004

(54) METHOD FOR VALIDATING SYSTEM CONFIGURATION IN A MASS CUSTOMIZED ENVIRONMENT

(75) Inventors: Nathan S. Caswell, Yorktown Heights, NY (US); Anil Nigam, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 09/652,042

(22) Filed: Aug. 31, 2000

(51) Int. Cl.$^7$ .......................... G06F 15/177; G06F 1/24
(52) U.S. Cl. .......................................... 713/1; 713/100
(58) Field of Search ............................ 713/2, 1, 100; 710/12; 705/53

(56) References Cited

U.S. PATENT DOCUMENTS

| | | | | |
|---|---|---|---|---|
| 4,589,063 A | * | 5/1986 | Shah et al. ..................... | 710/8 |
| 5,515,524 A | * | 5/1996 | Lynch et al. ................. | 395/500 |
| 5,668,995 A | * | 9/1997 | Bhat .......................... | 709/104 |
| 5,720,008 A | * | 2/1998 | McGuinness et al. ......... | 706/50 |
| 5,745,765 A | * | 4/1998 | Paseman ..................... | 395/701 |
| 6,178,502 B1 | * | 1/2001 | Caswell et al. ................ | 713/1 |
| 6,192,470 B1 | * | 2/2001 | Kelley et al. .................. | 713/1 |
| 6,263,382 B1 | * | 7/2001 | Bartlett et al. ................ | 710/10 |
| 6,405,308 B1 | * | 6/2002 | Gupta et al. ................... | 713/1 |
| 6,453,269 B1 | * | 9/2002 | Quernemoen .............. | 702/186 |
| 6,543,047 B1 | * | 4/2003 | Vrhel, Jr. et al. ........... | 717/121 |

FOREIGN PATENT DOCUMENTS

EP          0841616 A2   *   5/1998

OTHER PUBLICATIONS

David C. Brown, "Defining Configuring" in AI in Design Group, Nov. 17, 1997, pp1–10.*

* cited by examiner

*Primary Examiner*—Thomas Lee
*Assistant Examiner*—Chun Cao
(74) *Attorney, Agent, or Firm*—Whitham, Curtis & Christofferson, P.C.; Stephen C. Kaufman (57) ABSTRACT

A method for validating a specific device configuration when the set of all valid configurations is too large to practically enumerate. The method comprises the steps of selecting a set of components to be included in the device configuration, wherein the set has a single sink component in the set with only sink interfaces; defining an interface for each component, wherein each component is characterized as having a source or a sink property; and establishing connections between components based on the interface of each component. Connections are validated by ensuring that source and sink components have the same property values. Connections are established by verifying that the capacity of the sink is greater than or equal to the capacity of the source, and determining that for each source property there is one sink property with the same value and for each source property that there is one sink property with the same value.

15 Claims, 4 Drawing Sheets

METHOD FOR VALIDATING SYSTEM CONFIGURATION IN A MASS CUSTOMIZED ENVIRONMENT

BACKGROUND OF THE INVENTION

1. Field of the Invention

The present invention addresses the problem of validating specific system or device configurations, especially when the set of all valid configurations is too large to enumerate practically, e.g., in a mass customized environment.

2. Background Description

A product is a system or device produced to interact in a specified way with the rest of the world. We will use the term "product" to refer to a set of related entities, described by the specific values taken on by a set of variables. The "configuration" of a specific system or device is the set of values taken on by these variables. The configuration serves two functions. Externally, it allows a judgement on whether the system or device is appropriate for some purpose or teleology. Internally, it should map onto a unique set of components and component interconnections where "unique" is understood to allow for substitution of functionally equivalent components. A "valid" configuration is one that results in the correct operation of the system or device as a whole. The set of all valid configurations comprises the "configuration space". As the configuration space expands, the term "product" loses its connection to a single entity type and instead becomes a loose label for the configuration space. Mass customization is the case where the number of distinct systems in the configuration space is large as compared to the number of configurations physically produced.

Mass customized production faces a unique validation problem. For mass production of a small configuration space, each configuration can be physically tested, i.e., validated, before it is offered. For custom production (typically of high value systems or devices), each system or device is tested, individually and extensively, and adjusted to be valid. In mass customized production, prior physical validation would naively require building more test systems than production systems, thereby greatly increasing the cost. The problem then is, given a configuration, determine that it is valid with sufficiently high confidence to justify its production.

Simply enumerating all the configurations in a mass customized production configuration space may be impractical or even impossible. To provide insight into the practical difficulties of enumerating configurations, assume that a configuration can be defined by a "closed configuration space" characterized by a specific number of enumerated variables. The maximum number of configurations is the product over the variable properties of the number of values (cardinality) allowed for each variable, $$n_{max} = \prod_{i=1}^{i=N} n_i,$$

where N is the number of variables and $n_i$ is the fixed cardinality of the $i^{th}$ variable. Even simple spaces can result in a very large $n_{max}$; for example, a space with 5 variables with each $n_i=10$ has 100,000 ($10^5$) distinct configurations. Personal computer (PC) product offerings representing billions of configurations are routine. The configurable space of software applications, such as SAP software, can be even larger. The case of an "open configuration space" where the number of variables, their cardinality, and the specific values allowed vary over time or are indeterminate and fixed only on a case-by-case basis is even more problematic.

Existing configuration methods do not address the problem of validation directly. Instead, they reduce the problem to the determination of membership of the proposed configuration in a set of configurations deeded valid by engineering analysis, definition, or other means. In general, these methods perform selection from, refinement of, or navigation through a pre-defined set of valid (or not-invalid) configurations Even these methods are difficult, and so several strategies are used to limit the impact of large configuration spaces. These include (1) limiting the number and cardinality of key variables, (2) partitioning the configuration space into regions labeled as "product families", products or models, (3) defining key variables with no interdependence so they can be set independently, and (4) enforcing a sequential setting of variables to maximize the restrictions on the configuration space.

The standard solution to the mass customization configuration problem is a configuration constructed with an inference engine and an associated knowledge base or data base to implicitly define and navigate an implicit enumeration of configurations that do not violate known constraints (i.e., "not valid" configurations). Several approaches have been taken to building such a configurator. A review can be found in "Defining Configuring" in *Artificial Intelligence for Engineering Design, Analysis and Manufacturing* by David Brown (1988), 12, pp. 301–305. Set navigation depends on assertions about the configuration space defining the dependency, co-dependency and mutual exclusivity relationships among possible variable values. Assertions may be either concrete relationships involving any number of particular components, sub-systems or external characteristics of the system, or abstract relationships, referring to classes or expressions involving components, sub-systems, or external characteristics with unbound variables. Assertions may be explicitly exposed as data, explicitly encapsulated as methods or functions (program code), or implicitly embodied in the structure of the configurator or associated data base.

Building and then maintaining the knowledge base for a complex configuration space involves the difficult problem of representing complex iterations between interdependent variables. As one example, it is difficult to verify that all dependencies have been represented properly. The implicitly defined set of configurations may be too small (does not include valid configurations) or to large (includes invalid configurations) as a consequence. Dependencies may be missed because they are immaterial to the variables and values in use. Adding new variable values outside the "harmless" range exposes this problem without providing a clear path for discovery of the root cause and resolution. Because of these difficulties, knowledge base systems for complex configurations are typically employed either as convenient implementations of the simplified strategies listed above or as a starting point tool in situations where high value systems rely on individual final testing for authoritative configuration validation.

In summary, the problem solved by this invention is validation of a specific system or device configuration when the set of all valid configurations is too large to validate individually, enumerate in practice, or when the set is variable over time and therefore cannot be known in advance.

SUMMARY OF THE INVENTION

It is therefore an object of the present invention to provide a method for validating the configuration of a system or device in a mass customized environment.

It is another object of the invention to validate the configuration without requiring a knowledge base of the relationships between components that comprise the system or device.

It is a further object of the invention to provide a method of constructing a configuration from a known set of components such that either (a) a valid configuration is constructed and the configuration matches externally imposed specifications or (b) it is known that no such configuration can be constructed.

The method according to the invention accomplishes these objectives by segregating information about the configuration into information that is strictly a property of a single component of the configuration and the information that particular components are connected. The connection information consists of strictly topological information, i.e., what components are connected, and does not contain any information about the physical, logical or functional properties of the connection.

Component information is further segregated into properties physical, logical or functional properties of distinct interfaces. Each interface describes a possible connection point of the component. The properties of the interface provided by a component are solely properties of the component itself and not of any configuration in which it is used.

The only information required for validation is the set of properties of each interface of each component, and the topological connections between specific interfaces on specific components. No global knowledge of any relationship of any components or interfaces is used.

The primary advantage of this invention is its solution of the problem of validating configurations in a mass customizing environment, specifically the ease of maintaining the information required to validate a configuration. Since all the information required for validation is localized on individual components, individual components can be updated in, added to, or deleted from the set of available components without consideration of any relationship to any other component. Advantages that derive from the primary advantage are, first, that records of competitive configurations can be easily maintained and, second, that upgrades or reconfiguration can be done on configurations with obsolete components or on other vendor's configurations. The representations are compact enough that comprehensive historical records are feasible.

A further advantage is that the constructive validation approach allows for completion, by adding additional components, of a configuration starting with a set of components that determine key external characteristics. The preferred implementation for describing components is also amenable to stating the external specifications for the system corresponding to a given configuration. Additionally, the methods easily supports specification of configuration details, such as associating specific adapter cards with particular expansion slots in PC workstations.

The method has excellent scaling characteristics and can be used to characterize modest systems, such as a PC workstation, to an entire data center. The approach helps to underscore the essential relationships between different products and product families.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

A subscript notation is used hereinafter to distinguish individual components and interfaces follows the convention that subscripts i,j refer to component indices, while subscripts k, l refer to index interfaces. For example, $\tau_{ik,jl}$ denotes a connection from the $k^{th}$ interface of the $i^{th}$ component to the $l^{th}$ interface of the $j^{th}$ component.

Configuration, C, is defined to consist of two parts: a set of components, $\{c_i\}$, and the connections between pairs of components, $\{\tau_{ik,jl}\}$, in that set.

$$C=(\{c_i\}, \{\tau_{ik,jl}\})$$

Figure 1:
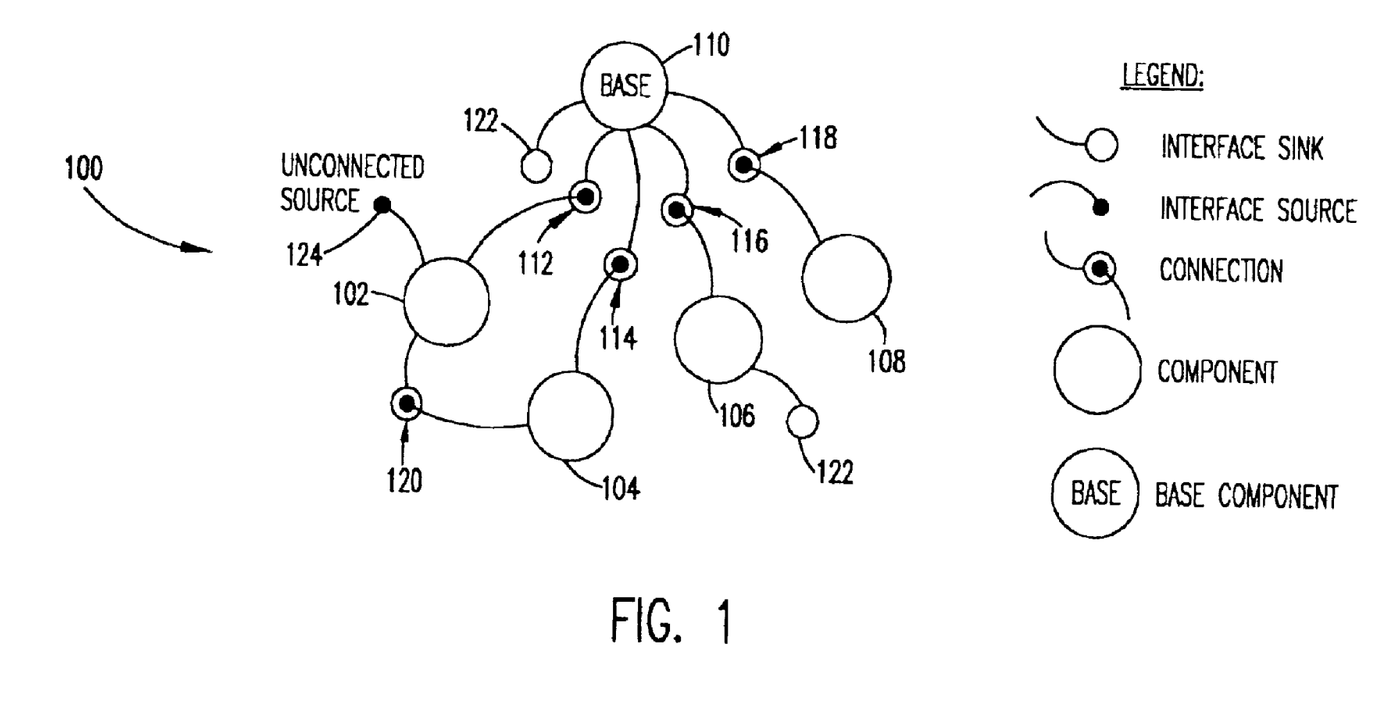
FIG. 1 is a diagram illustrating the relationship between components, source interfaces, sink interfaces, and their connection.

Referring now to the drawings, and more particularly to FIG. 1, there is shown a diagram illustrating the relationship between components, services, sinks, and connections. As shown in FIG. 1, a legend is provided that indicates the symbols used to illustrate these relationships. Specifically, the legend shows the symbols used for sink and source interfaces and connections between the sink and source interfaces. In FIG. 1, a configuration, C (100), is defined to consist of two parts: a set of components, $\{c_i\}$, and the connections (112, 114, 116, 118 and 120) between pairs of components (e.g. $\{\tau_{ik,jl}\}$) in that set. The connections (112, 114, 116, 118 and 120), in turn, are each comprised of a source interface 124 and a sink interface 122. A base component 110 is defined as a component with only sink interfaces. A configuration, C (100), is thus represented as C=($\{c_i\},\{_{ik,jl}\}$). It should also be understood that the configuration 100 may have one or more unconnected sources 124 and one or more unconnected sinks 122. Such a configuration is known as a partially valid configuration, and will be further discussed with regard to FIG. 3 herein.

Each component (102, 104, 106, 108 and 110) consists of a set of interfaces, $\{\tau_{ik}\}$, and information about the internal properties $\{p\}_i$ of the component. As noted above, each connection (112, 114, 116, 118 and 120) is defined between a source interface and a sink interface, rather than between components (102, 104, 106, 108 and 110), as suggested by the notation, and contain no information other than the ordered pair of connected source and sink interfaces.

Sink and source interfaces, in turn, are defined by a set of properties: $\{\tau_{ik}\} \equiv (a_D, a_C, a_m, \ldots)$. The properties are:

Direction, $a_D$, which characterizes whether the interface is a source or sink.

Capacity, $a_C$, which characterizes "how much" of some interface type a source provides or a sink requires.

Other, $a_m \ldots$, which characterize the purpose and operation of the interface.

Figure 2:
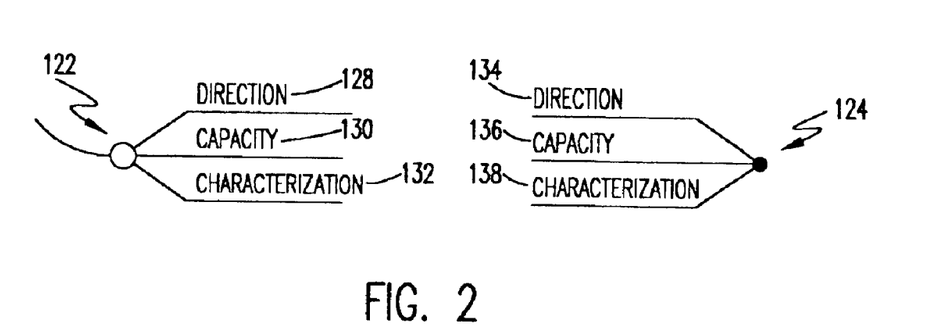
FIG. 2 is a diagram showing the three types of properties associated with source interfaces and sink interfaces.

The direction property, $a_D$, distinguishes two types of interfaces. As shown in FIG. 2, a sink interface 122 has a direction 128, and a source interface 124 has a direction 134. The direction property, $a_D$ (128, 134), distinguishes two types of interfaces by an intuitive notion of what "plugs into" what through the terms "interface source" 124 and "interface sink" 122. The meaning of the terms originates in the definition of a valid connection and is discussed further below. A connection (112, 114, 116, 118 and 120) consists of matching a source interface 124 on one component (e.g. 104) to a sink interface 122 on another component (e.g. 102). The interface is connected 120 when the source 124 "connects to" a sink 122.

Capacity, $a_c$, is a property of every interface. Sink interface 122 capacity 130 and source interface 124 capacity 136 characterize "how much" of some interface type a sink 122 or source 124 interface requires. Capacity, $a_c$ (130, 136), may be manifest in a variety of ways. The simplest is as a cardinality associated with the number of connection instances it supports (sinks, 122) or requires (sources, 124). It may also be represented as a continuous quantity, such as current available from a power supply, that may be apportioned among connected interfaces 122, 124. Bookkeeping associated with connections (112, 114, 116, 118 and 120) occurs through the capacity. Either a separate "used capacity" attribute of capacity is kept or the "available capacity" decremented as connections are made.

Characterization, $a_m \ldots$, represent other properties by values associated with the interface. Sink interface 122 characterization 132 and source interface 124 characterization 138 characterizes the purpose and operation of the interface. Practical application requires that the number and complexity of properties characterizing an interface (132, 138), be few and simple, even though there is no formal limitation. For most interfaces, these are physical characteristics such as length, width, and height for a space (i.e., mounting slot) interface; physical connector type and electrical protocol for an adapter card; and physical connector type, voltage, and current capacity for a power supply (where the current supplied is a capacity of the interface). Practical application requires that the number and complexity of properties characterizing an interface be few and simple, even though there is no formal limitation.

Components may have interfaces characterized by logical or functional properties of the component. An example is the storage capacity of a disk drive (e.g., 15 GB) or the triangle display rate of a 3D video adapter. These interfaces are generally sink interfaces for physical components. An example of their use is in configuring the software components of a system where each software component had a storage source interface with a capacity of a certain size.

In the simple case, values associated with a characterization 132, 138 (e.g., 3 inches, DB25 m connector, etc.) are fixed by a particular component (102, 104, 106, 108, 110). It may occur, however, that some aspects of characterizing an interface are not fixed by the interface, but can assume one of several discrete values or a value within a continuous range. For example, a PC planar (also known as a mainboard or "motherboard") can support multiple memory types (SDRAM (Synchronous Dynamic Random Access Memory)or EDO-DRAM (Extended Data Out Dynamic Random Access Memory) with or without ECC (Error-Correcting Code)or parity bits) in the same sockets. Another example would be "jumper selectable" options such as an I/O (Input/Output) address or interrupt channel. Note that the multiple values are associated with a particular interface of a particular component and do not represent a variation across components.

This "structure" for a configuration ensures that only the interfaces of a component (e.g., in FIG. 1, source interfaces 124 of component 104 shown in connections 120 and 114) matter for the purpose of checking the validity of a configuration 100. The configuration 100 does not include information about the composed system as a whole, as this does not contribute to the validation. Information about the characterization 132, 138 of a source 124 or sink 122 interface of a component (e.g., 106) is important to the desirability of the overall configuration. Validity, however, does not depend on desirability. Desirability of the composed system certainly depends on the internal properties of the components, $\{p\}_i$, but these do contribute to the validity of the configuration and will not be discussed further here. Finally, the connection (112, 114, 116, 118 and 120) between interfaces 122, 124 has been defined to contain no properties other than the fact of connection in a particular instance. The only information used to determine the validity of a configuration is the properties of the components involved. The interface properties are properties of the components alone.

Configuration Validity

A valid configuration 100 is one where:

for each interface (122, 124) of each component (112, 114, 116, 118, 120) requiring a connection (112, 114, 116, 118, 120) a valid connection exists; and every component has at least one interface with at least one connection.

An interface without a connection is referred to as an "open interface". This definition asserts that the collection of parts has no open interfaces and that there are no disconnected parts floating loose. Both of these refer to the intuitive notion of a configuration as a "whole" entity in its own right rather than as a "bag of parts".

Connection Validity

A valid connection, $\{\tau_{ik,jl}\}$ is one where:

the left hand index (ik) of the connection refers to a sink interface 124 and the right hand index (jl) refers to a source interface 126, the capacity 128 of the sink interface 124 is sufficient for the capacity 134 of the source interface 126 such that value($a_C^{sink}$)–value($a_C^{source}$)≧0), and for each source property there is one sink property with the same value and for each sink property there is one source property which has or can assume the same value.

$$\forall(a_m \in t_{ik})\exists(a_n \in t_{jl}) \wedge (a_m = a_n) \wedge \forall(a_n \in t_{jl})\exists(a_m \in t_{ik})\exists(a_n = a_m)$$

Partial Validity and the Environment Component

Figure 3:
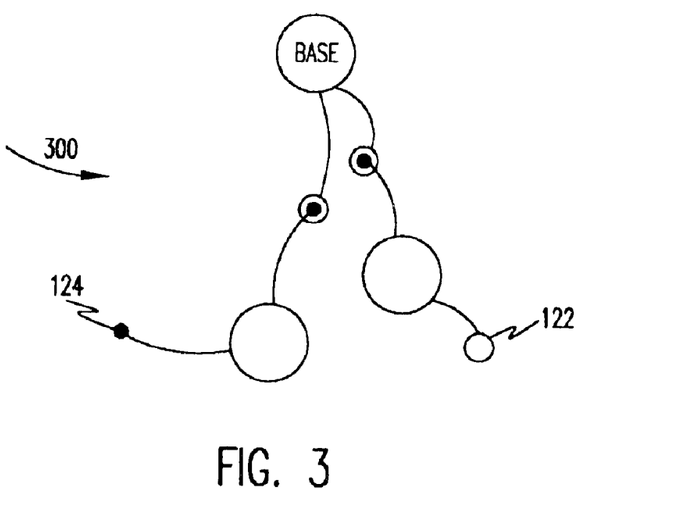
FIG. 3 is a diagram showing a partially valid configuration.

As shown in FIG. 3, a useful variation on the notion of a configuration 300 is to relax the requirement that there be no open source interfaces 124. The result is a partially valid or dependent configuration 300 which with its set of open source interfaces 124 and open sink interfaces 122 can be viewed as a component in a larger system. In the example of a "complete" PC, the power supply component has a source interface to an external power connection (typically, the 110 or 220 VAC mains) and the box (i.e., the mechanical frame) has a source interface requiring space. These interfaces require connections that are not part of the shipped unit, but which are expected to be valid in the environment where the unit is used.

The preferred mechanism for validating partial configurations is introduction of an "environmental component" that defines the intended environment of the configuration through a set of interfaces. In the PC example above, these are only sink interfaces to be connected to the open source interfaces of the partial configuration. The environment component may also contain source interfaces, in effect requiring that the configuration have a sink interface to which it can be connected. A simple example of this is a LAN (Local Area Network) connection. A PC may be valid without a Network Interface Card (NIC), although it would be an invalid configuration when combined with an environment with a LAN source interface.

The boundary represented by th environment component and a partially valid configuration amounts to a hierarchical decomposition of configurations. A component at one level of configuration may be represented as a partially valid configuration at a lower level and become part of a partially valid configuration at a higher level. The configuration method works equally well for configuring large numbers of routers, servers, racks, and interconnection wiring into a data center as it does configuring components into a PC. Each "component" of the data center may be independently configured with respect to an environment component. Similarly, components may represent independently configurable subsystems. Storage subsystems or video subsystems each comprised of multiple components are examples.

A practical value of partially valid configurations is the ability to discover "invariant subsystems" defined by partial configurations that are common to many or all of the configurations constructed. Invariant subsystems are valuable in a mass customized environment since they can be pre-assembled or purchased as units. While seemingly a simple notion, discovery of such invariant subsystems is hard in practice, particularly in mass customization environments. One example is the assembly of mechanical frames, power supplies, and front panel switches, plugs and message display components.

External Specification and Logical Components

A mechanism similar to environment components, "logical components" is used to define the external specification of a configuration when the specification refers to objective, measurable properties of the configuration. The logical (or alternatively, functional) component is composed of sink interfaces that, in a valid configuration, will be connected to a logical or functional interface of some component within the configuration. A logical component may define, for example, a complete system through source interfaces for processor, memory, storage, and video, each with some minimum capacity and properties.

Configuration Generation

Methods for generating valid configurations from partial inputs are implied by the definitions above and will be discussed next. Practical generation of a configuration extends beyond the technical validity of configurations to include both the validity rules discussed above and customer choice. The question here is one of generating consistent options from the partial input, not the resulting choices are presented or selected.

The definition of a valid configuration includes a set of components and a set of valid connections such that there are no open source interfaces. A configuration is created by selecting a set of components and then creating and validating the connections between the components. In the simplest use of configuration validation, the validity of a specified configuration is checked. It is also possible to automatically create connections either by discovering the only connections possible give a set of components (for example, a CPU module will only have one valid connection to a single processor PC planar) or through heuristics designed to select one of several possible connections (for example, populating memory slots or disk bays in a particular order).

Some partial configurations may be converted to valid configurations by the addition of one or more components. This is termed configuration completion and its goal is to add components providing connections from the open sink interface to a source interface on the base component. It is accomplished by searching components for those which have source interfaces that could satisfy one or more of the open sink interfaces in the invalid configuration and repeating this until a connection to the base component is made. There are three possible outcomes of this search. If no component or set of components is found that can complete the configuration, then the configuration is absolutely invalid, or impossible. If only one component or set of components is found that can complete the configuration, then the configuration is uniquely completable and a practical system can insert the required components to complete the valid configuration. If more than one component or set of components can complete the configuration, then a selection must be made. Since practical configuration systems would likely function by modification of one of a set of typical configurations or be designed for experts capable of making the required choices, this is not a drawback.

Again referring to FIG. 1, creation of valid connections is fundamental to the generation of a configuration 100. Recall that, as shown in FIG. 2, a connection (112, 114, 116, 118 and 120) can be created if the properties (134, 136, 138) of the source 124 and the properties (128, 130, 132) of the sink 122 interface "match". As noted above, a valid connection is between source 124 and sink 122 interfaces whose properties (134, 136, 138 and 126, 128, 130, respectively) are identical. If the property values of the proposed source 124 and sink 122 interfaces are identical, than they clearly match and the connection can be created. Interface properties that take on multiple values must be specialized for the particular connection during the process of creating the connection. The range on both the source 124 and sink 122 interfaces is set to the least common range. If there is no overlap the interfaces do not match and a connection can not be made.

As an example of creating connections, consider connecting memory modules to a motherboard. Assume that the motherboard has three physical Dual In-line Memory Module (DIMM) sockets that can support any of SDRAM, EDO, or ECC type memory modules but all modules must be of the same type. This is represented by a single interface with properties.

$$\tau_{memory} = \{a_D = \text{sink}, a_C = 3, a_{type} = \text{SDRAM} \wedge \text{EDO} \wedge \text{ECC}\}$$

Creating a connection to an EDO module results in restricting the motherboard interface to supporting further connection of EDO modules.

$$\lceil (\tau_{memory} = \{a_D = \text{sink}, a_C = 2, a_{type} = \text{EDO}\}) \rceil$$
$$\lfloor (\tau_{module} = \{a_D = \text{source}, a_C = 1, a_{type} = \text{EDO}\}) \rfloor$$

where we have assumed the convention of decrementing the source capacity as connections are made. Attempting to make a connection to a SDRAM module will fail. In a case where a larger range is supported by both the source and sink interface that range is maintained. For example, a connection between a ethernet network interface card (NIC) and a hub, both of which support either 10 Megabit per second (Mb/s) or 100 Mb/s operation would retain both options in the configured properties.

An extension to the requirement for identical properties is allowance for "optional properties". These properties have the characteristic that hey must have matching values if present on both interfaces, but are ignored if they appear only one of the two.

The simplest case is creation and subsequent validation of a configuration (that consists of a configuration component set and a set of connections) from a proposed set of components. A method is to construct the configuration in a tree like fashion by choosing a starting point and "plugging" the other components into the growing tree. The importance of this case is that it means that explicit connection information need not necessarily be kept in the configuration. Once a set of components has been validated, the connections for a valid configuration can be reconstructed on demand.

Figure 4A:
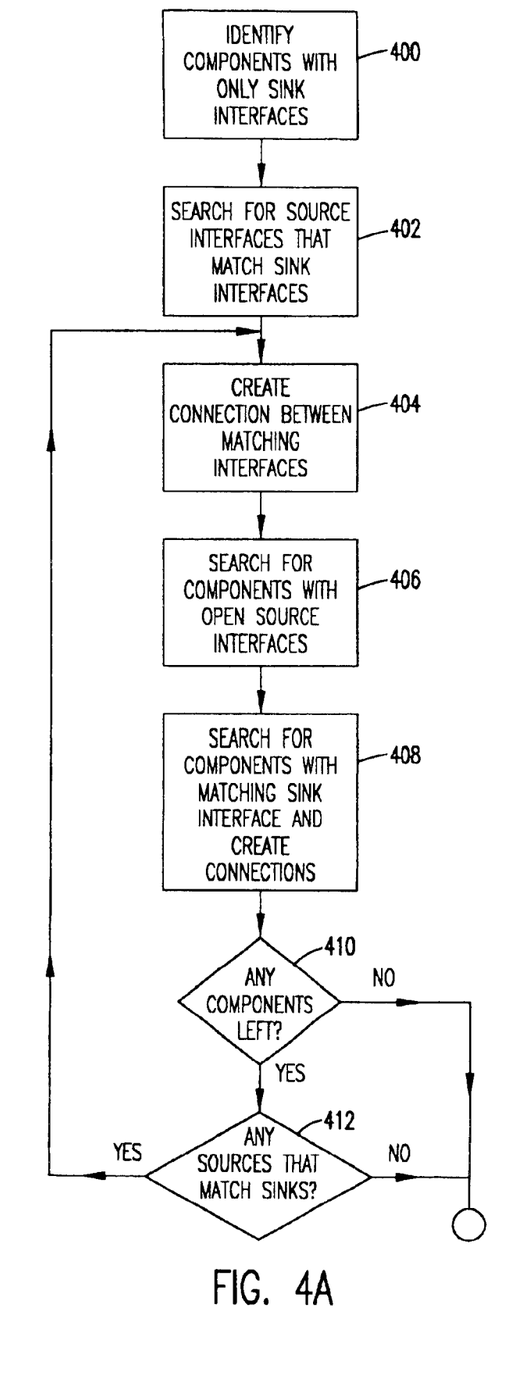
FIGS. 4A and 4B, taken together, are a flow chart showing the logic of establishing interface connections between components.
Figure 4B:
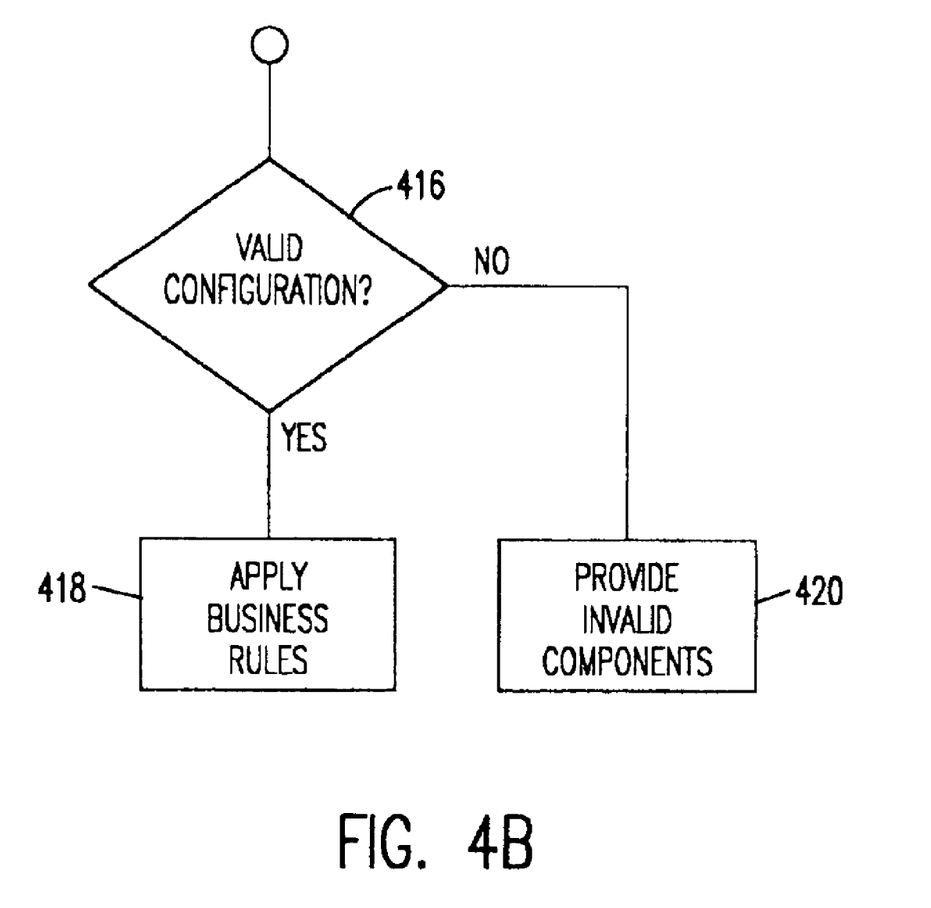

As shown in FIGS. 4A and 4B, the process includes the following steps. In step 400, components are identified in a proposed component set with only sink (i.e., no source) interfaces, and transferred to the configuration component set. Note that if there is more than one such component the configuration is invalid since it must fall into at least two parts. Components with no source interfaces are known as "base components", and are typically an item such as a mechanical frame. In step 402, the proposed component set is searched for source interfaces that match an open sink interface on the configuration component set. If found, the component is transferred from the proposed component set to the configuration component set. Then, in step 404, a connection is created between the matching interfaces.

In function block 406, a search is made to determine if there are any components in the configuration set with open source interfaces. Then, in step 408, components in the configuration set are searched for a matching sink interface, and a connection is created. In decision block 410, a test is made to determine if there are any components left in the proposed component set. If no, a validity determination is made in decision block 416. The configuration is considered to be valid if there are no components left in the proposed component set and there are no open source interfaces. The configuration may also considered to be partially valid if one of the components has either a capacity property or a characterization property, and the corresponding interface component does not have a corresponding capacity property or characterization property. Otherwise, the configuration is invalid.

In step 418, if the configuration is valid, validity rules, if applicable, are applied. In step 420, if the proposed set of parts does not result in a valid configuration, the diagnostics of what components had no connection to the base component and what source interfaces have no connections are available. How the diagnostic information is used is situation and implementation dependent. Unconnected component may indicate a serious problem, such as, for example, configuring an ISA (Industry Standard Adapter) card into a system with only PCI (Peripheral Component Interconnect) slots, although it may also indicate there are no slots left.

Use of the diagnostic information leads to methods for generation and validation of configurations when only partial component sets are provided. The symptom of partial component sets is exactly that there will be orphaned components and open interfaces. The resolution of an open source interface is to search the set of available components for one with a matching sink interfaces. If the found component also has a source that connects to an available sink in the configuration component set it can immediately become part of a suggested completion. For non-trivial situations heuristics for selecting from multiple components and constructing multiple component paths from open source interface to available sink interface are required.

Methods for generation and validation of configurations with the set of connections partially defined are better defined. Using the definition of partial configurations above, components with predefined connections are combined into a single effective component and the method for a proposed set of components used. If the set of proposed components and connections are composed separately, it is possible that there are connections which involve components that do not exist in the set of proposed components. Such connections are simply deleted from the configuration. There are no penalties or extra work involved in validating the configuration caused by the addition of partially defined connections.

An example of application of a partially defined connection set would be a corporate PC where it was desired to have adapter cards appear in a constant, standardized order. The defined connections would be between the connector interface of the adapter card components and a particular sockets on the motherboard. An obvious extension of this method is allowing relative identification among a set of interfaces such as "the modem goes in the last PCI slot".

If it is determined in decision block 410 that components are left, then a test is made in decision block 412 to determine if there are source interfaces in the proposed component set that match a sink interface in the configuration set. If yes, the process loops back to function block 404. If no, the validity determination in block 416 is made, as previously discussed.

Implementation

A simple algorithm for the validation function starts by finding a component with no sources and adds it to the system. The algorithm iterates over the remaining components. The component is connected to the system if the interfaces match. The algorithm terminates when all components have been processed. If all the sinks on the base component have been matched then the configuration is valid.

While the invention has been described in terms of a single preferred embodiment, those skilled in the art will recognize that the invention can be practiced with modification within the spirit and scope of the appended claims. For example, the method of the present invention can also be practiced at least in an automobile manufacturing setting, or in the contest of an entertainment center having numerous audio-visual components. In the context of automobile manufacturing, the base component may be the frame of an automobile, and the components comprise the numerous individual parts that are used to manufacture the automobile. Further, rules may be used such as "If the top speed of the automobile is 120 miles per hour (mph), tires having a rating of less than 120 mph cannot be used".

Having thus described our invention, what we claim as new and desire to secure by Letters Patent is as follows:

1. A method for validating a specific device configuration when a set of all valid configurations is unknown, comprising the steps of:

selecting a set of components to be included in the device configuration, wherein the set of components has a single base component having only sink interfaces;

defining an interface for each component, wherein each component is characterized as having a source or a sink interface and properties associated with the interface; and establishing connections between components having source and sink interfaces with matching properties, wherein the properties comprise a direction, a capacity, and a characterization properties.

2. The method recited in claim 1, wherein the direction property characterizes an interface as a source or sink interface.

3. The method recited in claim 1, wherein the capacity property is represented as a cardinality associated with a number of sink connection instances it supports or source instances it requires.

4. The method recited in claim 1, wherein the capacity property is represented as a continuous quantity that may be apportioned among connected interfaces.

5. The method recited in claim 1, wherein the characterization property defines a purpose and operation of the interface.

6. The method recited in claim 5, wherein the characterization property includes values associated with the interface.

7. A method for validating a specific device configuration when a set of all valid configurations is unknown, comprising the steps of:
   selecting a set of components to be included in the device configuration, wherein the set of components has a single base component having only sink interfaces;
   defining an interface for each component, wherein each component is characterized as having a source or a sink interface and properties associated with the interface;
   establishing connections between components having source and sink interfaces with matching properties; and
   validating connections between components, wherein the step of validating comprises the steps of:
   verifying that the sink capacity is greater than or equal to the source capacity;
   verifying that for each source property there is one sink property with the same value; and
   verifying that for each sink property there is one source property with the same value.

8. A method for validating a specific device configuration when a set of all valid configurations is unknown, comprising the steps of:
   selecting a set of components to be included in the device configuration, wherein the set of components has a single base component having only sink interfaces;
   defining an interface for each component, wherein each component is characterized as having a source or a sink interface and properties associated with the interface;
   establishing connections between components having source and sink interfaces with matching properties, wherein a connection between source and sink components remains valid if one of the components has either a capacity property or a characterization property, and the corresponding interface component does not have a corresponding capacity property or characterization property; and
   validating connections between components.

9. A method for validating a specific device configuration when a set of all valid configurations is unknown, comprising the steps of:
   selecting a set of components to be included in the device configuration, wherein the set of components has a single base component having only sink interfaces;
   defining an interface for each component, wherein each component is characterized as having a source or a sink interface and properties associated with the interface; and
   establishing connections between components having source and sink interfaces with matching properties, wherein the step of selecting comprises the steps of:
   identifying the base component in the set with only sink interfaces;
   searching the set for a component whose source interfaces match an open sink interface;
   creating a connection between the matching interfaces of the sink component and the component found in the searching step;
   searching the set for a component having an open source interface and, if found, searching the set for a component having a matching sink interface and, if found, creating a connection between the component having the open source interface and the component having the matching sink interface; and
   repeating the steps of creating and searching until either there are no components left in the set or there are no source interfaces in the set that match a sink interface.

10. The method as recited in claim 9, further comprising the step validating the configuration, wherein the configuration is valid if there are no components left in the set and there are no open source interfaces.

11. A method for validating a specific device configuration when a set of all valid configurations is unknown, comprising the steps of:
   selecting a set of components to be included in the device configuration, wherein the set of components has a single base component having only sink interfaces;
   defining an interface for each component, wherein each component is characterized as having a source or a sink interface and properties associated with the interface; and
   establishing connections between components having source and sink interfaces with matching properties, wherein a partial configuration of the specific device is defined as an open source or sink interface, further comprising the step of introducing into the device configuration an environment component that defines an intended environment of the configuration through a set of interfaces.

12. The method as recited in claim 11, wherein the partial configuration of the specific device is an open source interface and the environment component includes a matching sink interface.

13. The method as recited in claim 11, wherein the partial configuration of the specific device is an open sink interface and the environment component includes a matching source interface.

14. A method for validating a specific device configuration when a set of all valid configurations is unknown, comprising the steps of:
   selecting a set of components to be included in the device configuration, wherein the set of components has a single base component having only sink interfaces;
   defining an interface for each component, wherein each component is characterized as having a source or a sink interface and properties associated with the interface; and
   establishing connections between components having source and sink interfaces with matching properties, wherein a component of the specific device is a logical component that defines an external specification of a configuration when the specification refers to objective, measurable properties of the configuration.

15. The method as recited in clam 14, wherein the logical component comprises at least one sink interface that, in a valid configuration, will be connected to a logical or functional source interface of some other component within the device configuration.

* * * * *